(No Model.) 2 Sheets—Sheet 2.
G. RICHARDSON.
UNDERGROUND ELECTRICAL CONDUCTOR.
No. 259,046. Patented June 6, 1882.
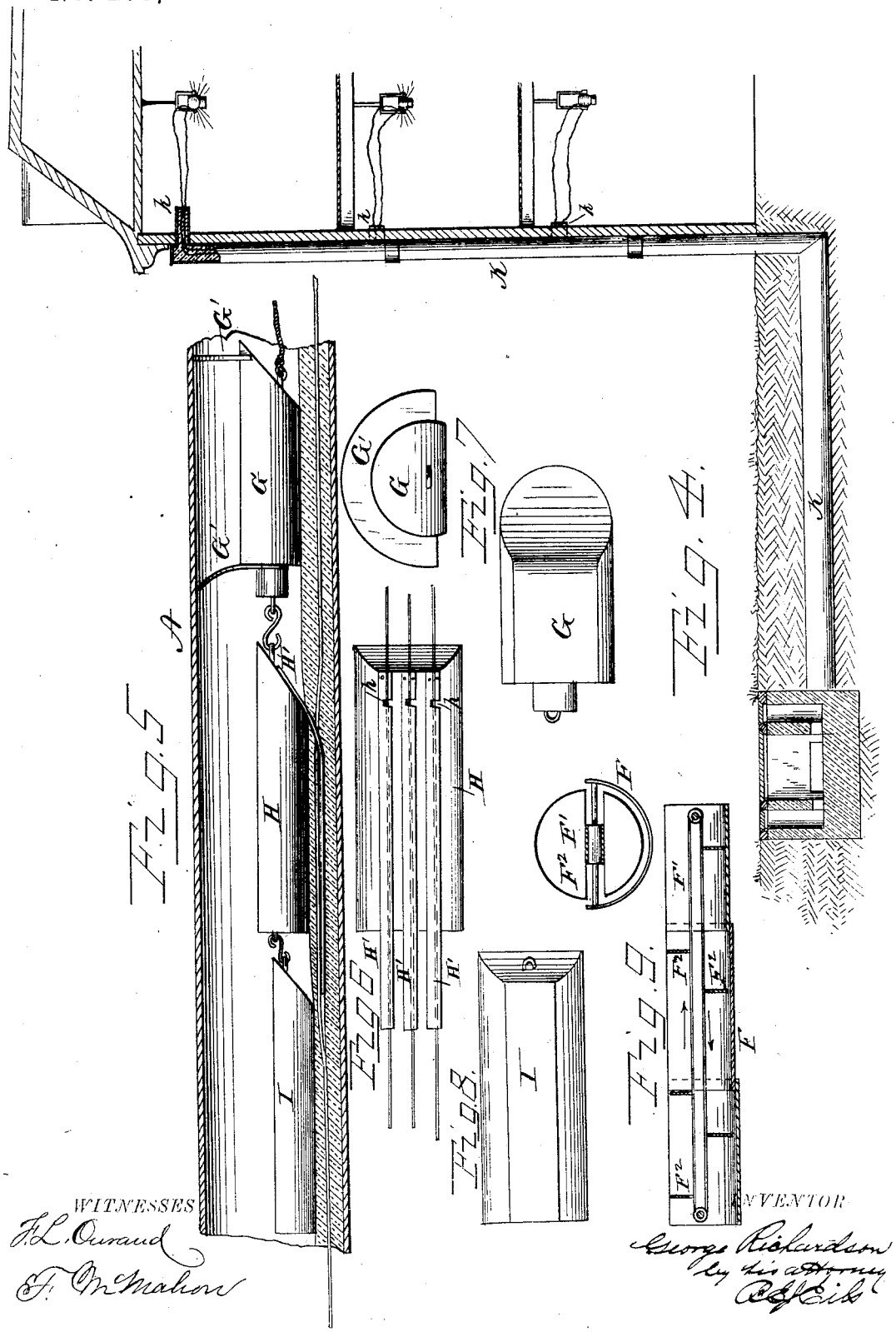
WITNESSES
INVENTOR
George Richardson

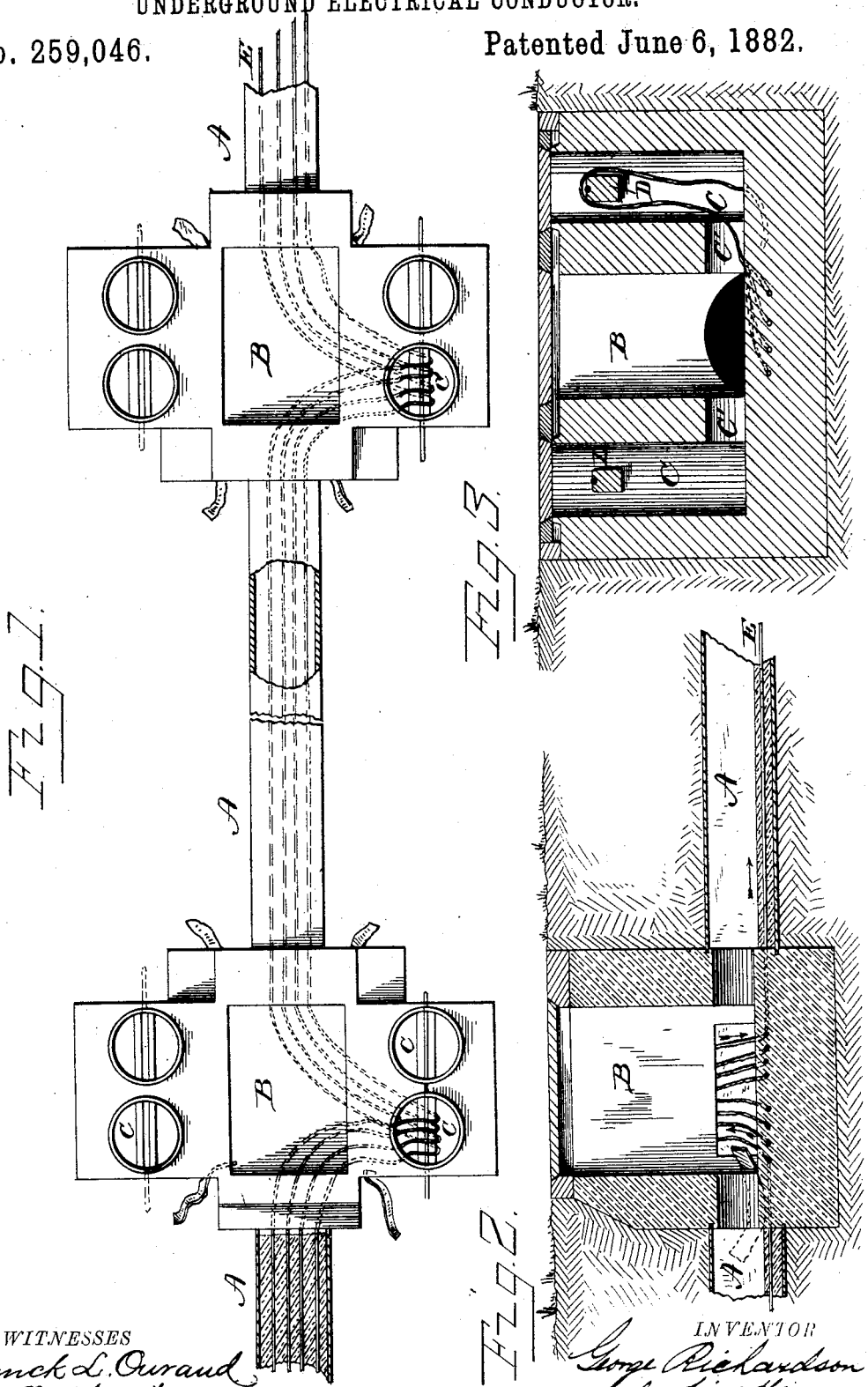

UNITED STATES PATENT OFFICE.

GEORGE RICHARDSON, OF PHILADELPHIA, PENNSYLVANIA.

UNDERGROUND ELECTRICAL CONDUCTOR.

SPECIFICATION forming part of Letters Patent No. 259,046, dated June 6, 1882.

Application filed April 11, 1882. (No model.)

*To all whom it may concern:*

Be it known that I, GEORGE RICHARDSON, a citizen of the United States, residing at Philadelphia, in the county of Philadelphia and State of Pennsylvania, have invented certain new and useful Improvements in Underground Electrical Conductors; and I do hereby declare the following to be a full, clear, and exact description of the invention, such as will enable others skilled in the art to which it appertains to make and use the same.

The principal object of my invention is to provide ways and means for laying and insulating underground electrical conductors to the end that, a conduit having been once constructed, additional wires or groups of wires may thereafter be laid and insulated in such conduit without necessitating the tearing up of the streets or the digging a trench.

To this end my invention consists mainly of an improvement of the art of laying and insulating underground electrical conductors, by first threading them through a suitable conduit and then incasing them with hydraulic cement or other non-conductor that can be applied in a plastic or fluid state and will afterward solidify.

The invention further consists of various details relating to the construction of the conduit.

In order that my invention may be clearly understood, I have illustrated in the annexed drawings and will proceed to describe both the construction of my improved underground conduit of electrical conductors and the manner of and means for insulating such conductors in a previously-laid conduit.

Figure 1 is a plan view of a section of a conduit containing one row or group of electrical conductors or wires. Fig. 2 is a vertical longitudinal section of the same. Fig. 3 is a transverse section of a vault and man-holes of such conduit. Fig. 4 illustrates a mode of carrying electric-light wires into a building from the main conduit. Figs. 5 to 9 illustrate the mode of and appliances for insulating a group of wires in a conduit.

The same letters of reference are used in all the figures to designate identical parts.

The conduit A, in which the wires E are to be laid, may be constructed in any preferred manner and of any suitable material. I prefer to construct it of carbonized stone cement pipe made and hardened under patents granted to me September 6, 1870, and December 3, 1872, and November 30, 1875. It should be built to have sufficient capacity not only for present needs, but for prospective needs—that is to say, if at the time of building the conduit ten wires are to be laid in it, its actual capacity should be much greater, so that more wires may be laid in it any time in the future. At suitable intervals along the conduit vaults B are constructed. These vaults should be made of considerable size, in order that workmen may have the necessary room to manipulate the appliances for threading and stretching wires through the conduit, and introducing and applying the insulating material. After a group of wires has been laid and insulated these vaults may be filled in, and so remain until it becomes necessary to lay an additional group of wires.

In order that access may be had at any time to the wires for testing or other purposes, I expose a section of each group of wires at a point in close proximity to each vault in a man-hole, C, accessible from the surface of the ground and communicating with said vault. If at the time of building the conduit but one group of wires be laid, then I may construct only a single man-hole for this purpose, other man-holes being added as more groups of wires are laid, although at the time of building the conduit as many man-holes may be constructed as groups of wires can be laid in the conduit. The insulation of each group of wires is continued in the vault, so that the full area of its bottom may be unobstructed by the wires, which are carried through a lateral arch, C', into the lateral man-hole, where they are preferably passed upward over a transverse bar or block, D; thence down again back through the arch C' into the insulating material at the bottom of the vault, to the next section of the conduit. The block D may consist of porous material capable of conducting surplus electricity, and should be connected to earth either directly or by means of a wire or wires or straps of copper or other good conductor, as shown in the drawings. After the group of wires has been laid and insulated, the man-holes, where the wires are exposed, may be filled up with suitable easily-removable insulating material, the upper portion of which will have to be removed whenever it is necessary to expose the wires for testing or other purposes. The use of such lateral man-holes enables me to lay each additional group of wires without in the least interfering with the group or groups before laid and to expose a section of each group separated from every other group, so that ready access may be had to any wire of any of the groups. The conduit should be laid on a level as nearly as practicable from one vault to another.

In laying and insulating a group of wires I proceed as follows: The wires are drawn or threaded through the conduit either from one end thereof to the other or else in sections from one vault to another, as may be most expedient. The extreme outer ends of the wires being suitably fastened, a stretching device is applied to them at the first vault, so as to hold them about an inch or two above the bottom of the conduit. Enough hydraulic cement, if that be used for insulating them, is then introduced in the conduit in a semi-fluid or plastic condition to cover the wires to the extent of two inches, more or less. The cement should be introduced at the same time from both ends of the section of conduit where the wires are being insulated. If the cement be sufficiently fluid to run, it may be poured in simply from both ends and allowed to stand for a little time, so as to thicken before the subsequent operations of troweling and compacting it are commenced; but I prefer to introduce the cement in the plastic state, and in order that it may be suitably distributed through the whole length of section of conduit a sectional trough, F, such as shown in Fig. 9, may be run into the conduit from each end by adding section after section until the troughs meet at the center of the section of conduit. An endless belt, F', is arranged in each sectional trough, constructed with transverse paddles or blades F². The plastic cement is placed in the trough and carried into the conduit by the paddles of the endless belt, which is to that end caused to travel by any suitable means, and as cement is being fed into the conduit the trough is gradually withdrawn, section after section being removed from it, or by running it gradually into the next adjacent section of the conduit. In this way the plastic cement may be pretty uniformly spread over the wires through a section of conduit one hundred feet or more in length. As soon as the cement has thus been introduced a chain or rope is threaded through the section of conduit from its extreme end to the first vault. To the end of the rope is attached a series of swivelingly-connected blocks, G H I, in the order stated, so that on drawing on the rope or chain at the vault the block G will first enter the conduit, followed by the block H, which is in turn followed by the block I. The office of the block G is to smooth the top of the plastic cement and to spread it of even thickness, and to scrape the sides of the conduit, to which end it is made comparatively light and provided with scrapers G' at its forward and rear ends, as clearly shown. I term the block G the "smoothing-block." The block H, which I term the "troweling-block," is made much heavier, and is provided with a series of trowels, H', at the bottom, a space being left between the bottom of the block H and its trowels H' about equal to the thickness of the coat of cement which is to be above the wires. A lateral notch, $h$, is cut in each trowel H' near the point where it is fastened to the block H, and in its upwardly-curved portion. There must be as many trowels as there are wires in the group to be insulated.

In applying the troweling-block one wire is passed into the notch $h$ of each trowel H', so that there will be a trowel H' under each wire. The troweling-block may then be drawn into the conduit. The trowels will operate to lift the wires slightly as the block is drawn along, and to trowel and compact the cement under the wires in the manner illustrated in Fig. 5. The compacting-block I is made quite heavy, in order that it may thoroughly compact the cement on the top of the wires as it is drawn along through the conduit. The forward end of each block should be suitably beveled, in order that it may readily slide over the cement. After the wires have been thus incased and insulated in the conduit they are carried through the arch C' of the vault into the man-hole, over the block or bar D therein, and returned into the vault and passed into the next section of the conduit. The wires then may be insulated in the succeeding section of the conduit in like manner, after which they may also be insulated in the bottom of the first vault, and the said vault closed or filled up. After the cement has solidified around the wires it forms a solid insulation-bed in which the wires are incased, and by which they are held in position and protected from moisture.

I prefer to insulate the wires in hydraulic cement, and in substantially the manner hereinbefore described; but the wires may be insulated in other suitable material that can be applied in a fluid or plastic state and will subsequently solidify. The whole conduit, together with the vaults and man-holes, should be made practically water-tight.

In supplying buildings with electric currents for electric lamps or for driving machinery there is considerable danger of fire. To lessen this danger as much as possible I propose to conduct the loops of the main wire from the main conduit through a branch conduit, K, composed of sections of cement pipe erected either inside or outside of the building to reach to the highest point where the current is to be utilized, and provided with suitable branches, $k$, to loop the wire off at any desired point or points. The whole of the loop of wire in the pipe or branch K will be thoroughly insulated, preferably in hydraulic cement, so that only the short loops in the building will be exposed.

I do not herein claim the instrumentalities described for applying the insulating material to the wires, but reserve the right to claim them hereafter in a separate patent.

I do not herein claim the mode or means of leading electrical conductors into buildings, but reserve the right to claim that hereafter in a separate patent.

Having thus described my invention, what I claim is—

1. The improvement of the art of laying and insulating underground electrical conductors or wires, which consists in first threading or drawing the wire or wires through a previously-constructed covered conduit or section thereof, and then insulating such wires from the ends of the conduit or section by covering them with a fluid or plastic insulating substance which will solidify around them, all substantially as before set forth.

2. A conduit for electric wires, composed of a line of pipes, intersecting vaults, and one or more lateral man-holes at each vault, substantially as before set forth.

In testimony whereof I affix my signature in presence of two witnesses.

GEORGE RICHARDSON.

Witnesses:
B. E. J. EILS,
C. A. NEALE.